United States Patent
Popek

(10) Patent No.: US 11,560,113 B2
(45) Date of Patent: Jan. 24, 2023

(54) AIRBAG MODULE WITH AIRBAG RETAINER FILTER LAYER

(71) Applicant: ZF Passive Safety Systems US Inc., Washington, MI (US)

(72) Inventor: Joseph Popek, Shelby Township, MI (US)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 0 days.

(21) Appl. No.: 17/142,328

(22) Filed: Jan. 6, 2021

(65) Prior Publication Data

US 2022/0212623 A1 Jul. 7, 2022

(51) Int. Cl.
  *B60R 21/217* (2011.01)
  *B60R 21/203* (2006.01)
  *B01D 39/10* (2006.01)
  *B01D 39/12* (2006.01)
  *B60R 21/26* (2011.01)

(52) U.S. Cl.
  CPC ............ *B60R 21/217* (2013.01); *B01D 39/10* (2013.01); *B01D 39/12* (2013.01); *B60R 21/203* (2013.01); *B60R 21/26* (2013.01); *B60R 2021/26011* (2013.01)

(58) Field of Classification Search
  CPC ..... B60R 21/217; B60R 21/203; B60R 21/26; B60R 2021/26011; B01D 39/01; B01D 39/12
  See application file for complete search history.

(56) References Cited

U.S. PATENT DOCUMENTS

| | | | | |
|---|---|---|---|---|
| 4,278,638 A | * | 7/1981 | Nilsson | B60R 21/2644 280/731 |
| 5,087,070 A | * | 2/1992 | O'Loughlin | B60R 21/2644 280/736 |
| 5,139,280 A | * | 8/1992 | Cord | B60R 21/2644 280/731 |
| 5,215,721 A | * | 6/1993 | Tasaki | B60R 21/2644 102/530 |
| 5,346,254 A | * | 9/1994 | Esterberg | B60R 21/2644 280/741 |
| 5,382,046 A | * | 1/1995 | Cuevas | B60R 21/2035 280/728.2 |
| 5,505,488 A | * | 4/1996 | Allard | B60R 21/217 280/728.2 |
| 5,527,018 A | * | 6/1996 | Wahl | B01D 29/117 266/120 |
| 5,542,692 A | * | 8/1996 | Shaklik | B60R 21/217 280/728.2 |

(Continued)

*Primary Examiner* — Paul N Dickson
*Assistant Examiner* — Timothy Wilhelm
(74) *Attorney, Agent, or Firm* — Tarolli, Sundheim, Covell & Tummino LLP

(57) ABSTRACT

A retainer secures an airbag inflator to a base plate of an apparatus for helping to protect an occupant of a vehicle. The retainer includes a base wall and a sidewall that extends from the base wall and is configured to encircle a discharge portion of the inflator from which the inflation fluid is discharged. The retainer also includes a filter liner secured to the retainer sidewall, wherein the sidewall and filter liner are configured so that inflation fluid discharged from the discharge portion is directed into the filter liner.

22 Claims, 3 Drawing Sheets

(56) References Cited

U.S. PATENT DOCUMENTS

| | | | | |
|---|---|---|---|---|
| 5,658,008 | A * | 8/1997 | Herrmann | B60R 21/217 |
| | | | | 280/728.2 |
| 5,836,608 | A * | 11/1998 | Soderquist | B60R 21/261 |
| | | | | 280/728.2 |
| 6,149,192 | A * | 11/2000 | Swann | B60R 21/26 |
| | | | | 280/740 |
| 6,186,541 | B1 * | 2/2001 | Ruge | B60R 21/2644 |
| | | | | 280/736 |
| 6,189,924 | B1 * | 2/2001 | Hock | B60R 21/217 |
| | | | | 280/736 |
| 6,336,660 | B1 * | 1/2002 | Katsuda | B60R 21/2644 |
| | | | | 280/741 |
| 6,341,799 | B1 * | 1/2002 | Furusawa | B60R 21/217 |
| | | | | 280/736 |
| 6,364,342 | B1 * | 4/2002 | Kim | B60R 21/217 |
| | | | | 280/728.2 |
| 6,886,856 | B2 * | 5/2005 | Canterberry | B60R 21/2644 |
| | | | | 102/531 |
| 7,497,468 | B2 * | 3/2009 | Choi | B60R 21/217 |
| | | | | 280/740 |
| 7,740,268 | B2 * | 6/2010 | Sauer | B60R 21/217 |
| | | | | 280/728.2 |
| 8,910,364 | B2 * | 12/2014 | Overton | B60R 21/261 |
| | | | | 29/428 |
| 9,370,740 | B2 * | 6/2016 | Hill | B01D 46/0013 |
| 9,539,977 | B2 * | 1/2017 | Fudamoto | B60R 21/217 |
| 2007/0063495 | A1 * | 3/2007 | Saito | B60R 21/2644 |
| | | | | 280/736 |

* cited by examiner

AIRBAG MODULE WITH AIRBAG RETAINER FILTER LAYER

BACKGROUND

This disclosure relates to an apparatus for helping to protect an occupant of a vehicle upon the occurrence of an event, such as a vehicle collision. In particular, the present invention relates to an airbag module. A driver or passenger airbag module includes an airbag that is inflatable to a deployed position between the vehicle steering wheel and an occupant of a driver seat or instrument panel and passenger occupant of the vehicle. The airbag has a stored condition in which the airbag is deflated and concealed by a cover of the airbag module. An inflator is actuatable to produce inflation fluid that is directed into the airbag, which causes the airbag to inflate and deploy.

Inflators include a gas generating material or propellant that undergoes a chemical reaction when the inflator is actuated. The chemical reaction produces an effluent that is discharged from the inflator. The effluent includes inflation fluid for inflating and deploying the airbag. The effluent also includes byproducts of the chemical reaction other than inflation fluid. These byproducts can include solid particulates and metallic vapors.

Solid particulates can be categorized in two groups: low temperature particulates and high temperature particulates. Low temperature particulates comprise slag or other metallic materials. High temperature particulate comprise gas generating/propellant materials.

Metallic vapor can contribute to the solid particulates. The metallic vapor condenses and coalesces outside the inflator on airbag module surfaces, such as surfaces of the bag retainer. As it accumulates on the retainer surface, this solidified metallic vapor can separate and contribute to the solid particulates directed into the airbag.

The existence of solid particulates in the inflator effluent does not ensure the particulate will penetrate the airbag fabric. The particulates must possess sufficient energy to penetrate the airbag fabric. The three main variables that determine the amount of energy possessed by a particulate are mass, velocity and temperature. While these three variables can vary considerably, any one of them can be sufficient to produce the energy necessary to penetrate the airbag fabric. For example, low temperature particulates, such as slag and/or metallic particulates, can have comparatively high masses and/or velocities. As another example, high temperature particulates, such as gas generant and/or propellant particulates, can have comparatively low masses and/or velocities. Because of this, mass, velocity, and temperature can combine to produce a particle with sufficient energy to penetrate the airbag fabric.

For example, a comparatively low mass, low velocity particulate, such as gas generant and/or propellant particulates, can have a temperature high enough to break down and penetrate the airbag fabric. A comparatively low mass, low temperature particulate can have a high enough velocity to penetrate the airbag fabric, as can a comparatively low temperature, low velocity particulate can have a high enough mass to penetrate the airbag fabric. This can be the case, for example, with slag and/or metal/metallic particulates.

Conventional driver or passenger airbag inflators have a generally cylindrical configuration and include a housing or combustion chamber with a cylindrical sidewall. Inflation fluid is directed radially from openings extending through the sidewall. Conventional airbag retainers include a base and a sidewall that extends perpendicularly from the base. The retainer sidewall encircles the inflator and is spaced from the inflator sidewall. The retainer sidewall extends parallel to the inflator sidewall so that inflation fluid discharged radially from the inflator travels perpendicularly toward the retainer sidewall. The inflation fluid strikes the retainer sidewall perpendicularly before entering the airbag.

When the particulates travelling with the inflation fluid strikes the retainer sidewall perpendicularly, their velocities are reduced. Additionally, the particulates can break-up, which reduces the mass of each resulting particulate. Further, due to heat transfer with the retainer sidewall, and the increased overall surface area of the broken-up particulates, their temperatures can also be reduced. As a result of the particulates striking the retainer sidewall, they can lose energy, which helps prevent them from producing holes in the airbag fabric.

The force applied to the retainer sidewall by the inflation fluid can often can be so high that the retainer sidewall is deformed outward radially. When this occurs, the particulates that would normally strike the sidewall perpendicularly instead strike the angled sidewall. As a result, the sidewall absorbs less energy from particulates, and the mass, velocity, and temperature of the particulates are less likely to be reduced. The particulates therefore lose less energy while, at the same time, are deflected toward the airbag. These higher energy particulates are more likely to create holes in the airbag fabric.

SUMMARY

A retainer secures an airbag inflator to a base plate of an apparatus for helping to protect an occupant of a vehicle. The retainer includes a base wall and a sidewall that extends from the base wall and is configured to encircle a discharge portion of the inflator from which the inflation fluid is discharged. The retainer also includes a filter liner secured to the retainer sidewall, wherein the sidewall and filter liner are configured so that inflation fluid discharged from the discharge portion is directed into the filter liner.

According to a first aspect, an airbag module can include an airbag inflatable between a mounting structure of the vehicle and the vehicle occupant and an inflator that is actuatable to provide inflation fluid for inflating the airbag. The airbag module can also include a base plate connectable with the mounting structure and the retainer. The retainer secures the inflator to the base plate.

According to the first aspect, the base wall of the retainer can include an opening through which the discharge portion of the inflator extends. The inflator can include a flange that projects radially from the discharge portion and is clamped between the retainer and the base plate. Additionally, the airbag can include a mouth portion that is clamped between the base plate and the retainer to secure the airbag to the airbag module.

Additionally or alternatively, according to the first aspect, the inflator can have a central axis and the discharge portion can include a cylindrical sidewall centered on the inflator axis. The sidewall of the retainer can extends from the base wall in a direction that is parallel to the inflator axis.

Additionally or alternatively, according to the first aspect, the base plate can be configured to be connected to a vehicle steering wheel. The airbag can be inflatable between the vehicle steering wheel and the vehicle occupant.

According to a second aspect, the filter liner can include a filter screen material configured to force inflation fluid directed into the filter liner to follow a tortuous path through the filter liner. According to this aspect, the filter liner can be configured to receive particulates in the inflation fluid and reduce the energies of the particulates in order to prevent the particulates from damaging airbag fabric. Additionally, the filter liner can be configured to reduce the energies of the particulates by reducing at least one of their mass, velocity, and temperature. Further, the filter liner can be configured so that the particulates strike the filter screen material and fracture.

Additionally, according to the second aspect, the filter screen material can include at least one of a woven wire screen, a knitted wire screen, a stamped metal screen, or an expanded metal screen.

Additionally, according to the second aspect, the filter screen material can include at least one a mesh of woven or knitted metal wires or fibers, a stamped metal mesh, a mesh of bent, twisted, or otherwise intertwined metal wires or fibers, and an expanded metal mesh.

Additionally, according to the second aspect, the filter screen materials can be compressed to form the filter liner.

Additionally, according to the second aspect, the filter liner can be secured to the retainer sidewall via at least one of an adhesive, tape, hooks integrally formed in the retainer sidewall, a spot weld, a tack weld, and an inward-turned rim portion of the retainer sidewall that creates a pocket configured to receive the filter liner.

According to a third aspect, the retainer can include inward-turned rim portion of the retainer sidewall. According to this aspect, the inward-turned rim portion can define a pocket in which the filter liner is received. The retainer can be configured so that the retainer sidewall deflects outwardly in response to inflation fluid discharged from the inflator. The filter liner can deflect outwardly with the retainer sidewall. The rim portion can be configured to block particulates that pass through the outwardly deflected filter liner.

According to a fourth aspect, the retainer sidewall can include hooks for retaining the filter liner.

BRIEF DESCRIPTION OF THE DRAWINGS

The foregoing and other features will become apparent to one skilled in the art to which this disclosure relates upon consideration of the following description with reference to the accompanying drawings, in which.

DETAILED DESCRIPTION

Figure 1:
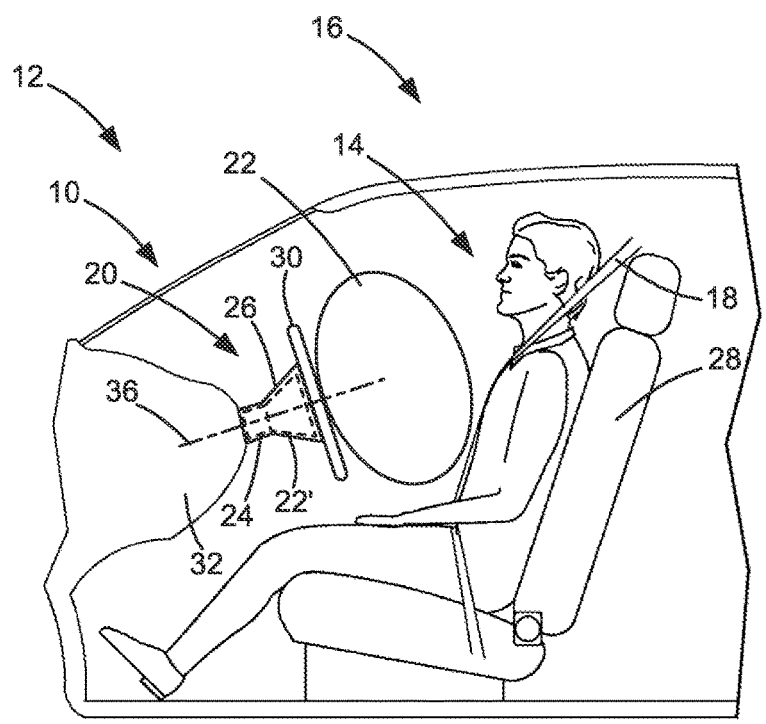
FIG. 1 illustrates schematically an example configuration of an apparatus for helping to protect an occupant of a vehicle.

FIG. 1 illustrates an example configuration of an apparatus 10 for helping to protect an occupant 14 of a vehicle 12. The apparatus 10 includes an airbag module 20 fitted with improved filtration features that are described in detail herein. In this description, the airbag module 20 of the example configuration of FIG. 1 is a driver front airbag module configured to be mounted on a steering wheel 30 on a driver side 16 of the vehicle 12. This disclosure, however, is not limited to the illustrated driver frontal airbag module configuration. The improved filtration features described with regard to the airbag module 20 of the example configuration can also be applied to other module implementations, such as passenger frontal airbag modules and side airbag modules.

The vehicle 12 also includes a seatbelt 18 for helping to restrain the occupant 14 in a vehicle seat 28.

The airbag module 20 includes an airbag 22, an inflation fluid source 24, such as an inflator, and a structure 26, such as a housing, for supporting the airbag 22 and inflator 24 in the vehicle 12. The airbag has a stored condition, indicated generally in dashed lines at 22', in which the airbag is deflated, folded, and stored in the housing 26. The housing 26 may include a cover (not shown) that helps conceal the airbag 22 while in the stored condition.

The inflator 24 is actuatable to inflate the airbag from the stored condition to a deployed condition illustrated generally in solid lines at 22. When the inflator 24 is actuated, the cover moves from a closed condition helping to conceal the airbag 22 in the housing 26 to an open condition allowing the airbag to inflate and deploy from the housing.

The airbag 22 inflates and deploys in a direction away from the steering wheel 30 and generally parallel to a steering axis 36 of the vehicle 12. In the deployed condition, the airbag 22 is positioned between the occupant 14 and the steering wheel 30 and between the occupant and an instrument panel 32 on the driver side 16 of the vehicle 12. The airbag 22, when in the deployed condition, helps absorb the forces of impacts with the airbag and helps distribute the impact forces throughout the airbag in order to cushion the occupant and provide a desired ride-down effect.

Figure 2:
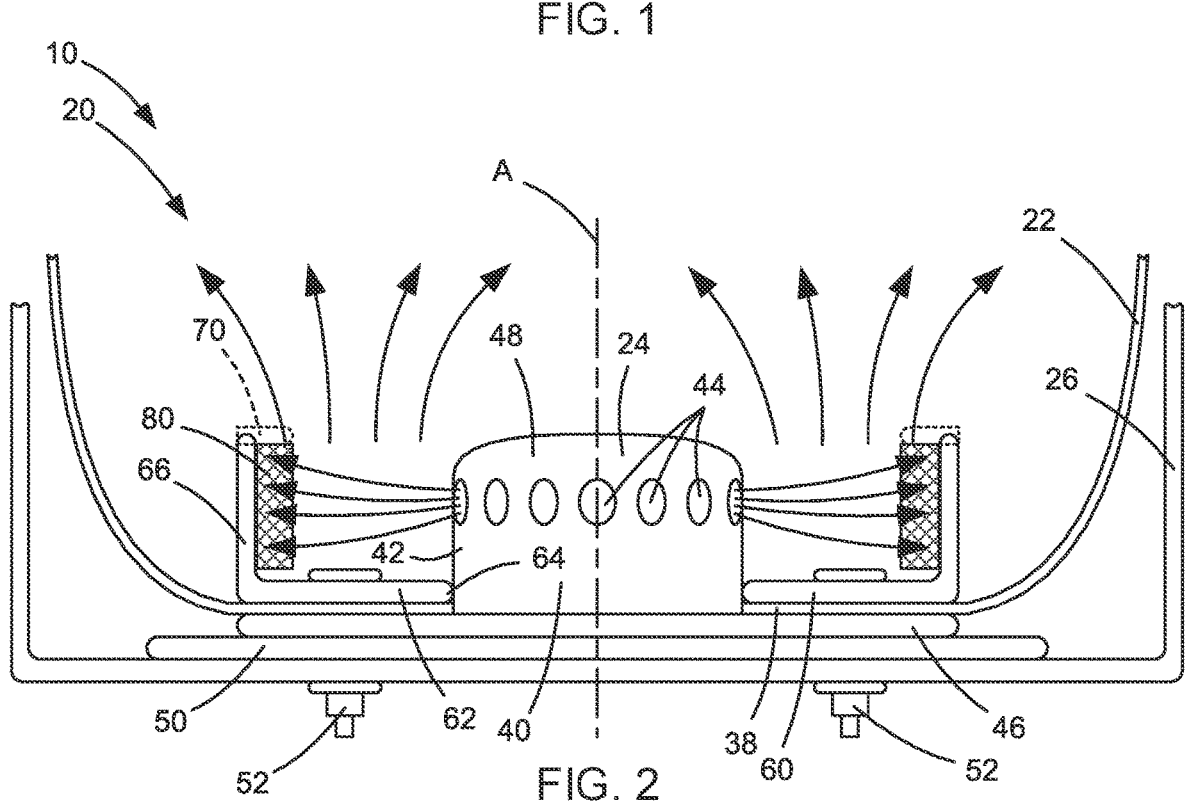
FIG. 2 is a schematic side view of an airbag module portion of the apparatus of FIG. 1.

FIG. 2 is a schematic illustration of the airbag module 20. FIG. 2 intentionally illustrates only those components that are necessary to describe the improved filtration features of the invention. FIG. 2 therefore omits components, such as the cover, as they do not affect the filtration features of the airbag module 20 and are not necessary in providing a detailed description thereof.

Referring to FIG. 2, the inflator 24 includes an inflator housing 40, which contains a gas generating and/or propellant material. The inflator housing 40 has a cylindrical sidewall 42 that includes openings 44 through which inflation fluid is discharged when the inflator is actuated. The sidewall 42 and openings 44 define a discharge portion 48 of the inflator 24. The inflator 24 also includes a flange 46 that projects radially from, and extends circumferentially about, the inflator housing 40. The inflator 24 has a central axis A about which the sidewall 42 extends. In the driver airbag module configuration illustrated in FIG. 2, the sidewall 42 and the discharge portion 48 have cylindrical configurations, wherein the openings 44 discharge inflation fluid radially. Additionally, the inflator flange 46 can be generally circular and disc-shaped, forming an annulus around the discharge portion 48.

In addition to the airbag 22, inflator 24, and housing 26, the airbag module 20 includes a base plate 50 and a retainer 60. The base plate 50 is configured to be connected to vehicle structure, such as a steering wheel hub, either directly or indirectly in order to anchor the air bag module 20 to the vehicle 12. In some configurations, the base plate 50 can be connected via a spring biased structure that allows the airbag module 20 to serve as a horn switch actuator.

The retainer 60 has a base wall 62 with a central opening 64 that is sized to permit a discharge portion 48 of the inflator housing 40 to pass through. The inflator 24 is positioned on the base plate 50 and the retainer 60 is positioned over the inflator 24 with the discharge portion 48 of the inflator housing 40 passing through the opening 64 in the base wall 62. The inflator flange 46 is positioned or sandwiched between the base plate 50 and the retainer 60. A mouth portion 38 of the airbag 22 can also be positioned or sandwiched between the base plate 50 and the retainer 60. Fasteners 52 extend through the base wall 62, inflator flange 46, airbag mouth portion 38, and base plate 50 and provide a clamping force that secures the inflator flange 46 and airbag 24 between the base plate 50 and retainer 60. The fasteners 52 can also cooperate with horn switch structures (not shown) in the aforementioned horn switch application of the base plate 50.

The base plate 50 and retainer 60 can have any material construction suited to perform the functions described herein. For example, the retainer 60 and/or base plate 50 can have a metal, e.g., cast or stamped metal, construction. As another example, the retainer 60 and/or base plate 50 can have a single piece construction, such as a cast or molded polymer or plastic material.

The retainer 60 also includes a sidewall 66 that extends perpendicularly from the base wall 62. The retainer sidewall 66 encircles the inflator and is spaced from the inflator sidewall. The retainer sidewall 66 extends parallel to the inflator sidewall 42 so that inflation fluid discharged radially from the inflator 24 travels laterally and/or perpendicularly toward the retainer sidewall. The inflation fluid strikes the retainer sidewall 66 before entering the airbag.

The surface of the retainer sidewall 66 facing the discharge portion 48 of the inflator 24 is fitted with a filter liner 80 that extends along the length of the sidewall and therefore can encircle the inflator. The filter liner 80 is a porous structure having a thickness and density selected so that the filter occupies a volume, a certain portion of which is open space, and the remainder of which is occupied by the filter material. Fluids can pass through the filter, but must follow a tortuous path enforced by the filter material.

The filter liner 80 can have a variety of material constructions or combination of material constructions. For example, the filter liner 80 can include a screen material, such as a mesh of woven or knitted metal wires or fibers, a stamped metal mesh, or a mesh of bent, twisted, or otherwise intertwined metal wires or fibers. In one particular example, the filter liner 80 can include an expanded metal mesh in which a metal sheet is stamped to create a matrix of cutouts bounded by the remaining metal, and then stretched so that the remaining metal is distorted and takes on a somewhat twisted and 3-dimensional shape. Other filter constructions, such as metal fiber filter materials, can also be used. Any of these example constructions can be utilized alone or in combination to form the filter liner 80.

The filter liner 80 can be formed by placing any of the aforementioned filter materials in tooling, such as a metal form or die, that compresses and forms/deforms the filter material to the desired dimensions and density. In doing so, a degree of randomness and irregularity is imparted to the internal structures of the filter liner 80, which improves its filtering capabilities. The filter liner 80 can be formed in this manner in layers of the same filter materials or different filter materials. The filter liner 80 can be formed in an elongated strip, with a generally rectangular cross-section, that is cut to length and fitted to the retainer sidewall 66. Alternatively, the filter liner 80 can be formed in an endless loop of material using a cylindrical metal form or die.

The filter liner 80 can be secured to the retainer sidewall 66 in a variety of manners. For example, the filter liner 80 can be secured to the retainer sidewall 66 by spot welding or tack welding. As another example, the filter liner 80 can be secured to the retainer sidewall 66 using an adhesive or tape.

As another example, the filter liner 80 can be secured to the retainer sidewall 66 using hooks (illustrated in dashed lines at 74 in FIG. 3) integrally formed in the sidewall. As a further example, as shown in FIG. 4, the retainer sidewall 66 can include an inward-turned rim portion 70 that creates a pocket 72 that extends circumferentially around the discharge portion 48 of the inflator 24. The pocket 72 can be configured to form an interference with a height dimension of the filter liner 80, so that the filter liner is "stuffed" into and retained in the pocket. The rim portion 70 can also block axial movement of the filter liner 80 out of the pocket 72. In this manner, the filter liner 80 can be retained in the pocket 72 at least partially by friction between the retainer 60 and the filter liner.

When the inflator 24 is actuated, inflation fluid is exits the discharge portion 48 through the openings 44, as indicated generally by the arrows. Inflation fluid, along with any solid particulates (slag, metal, gas generant products, propellant products), travel with the inflation fluid flow into the filter liner 80. The filter liner 80, constructed as described above, forces the inflation fluid to follow a tortuous path through the liner material. The solid particles in the inflation fluid eventually strike the material of the filter liner 80, are slowed, and are trapped in the liner. The density of the filter liner 80, determined through the construction methods described above, is selected so that the filter liner includes open space sufficient to permit the necessary volumetric flow rate of inflation fluid through the filter liner while, at the same time, include sufficient filter structure to trap a the particulates necessary to avoid airbag damage.

When particulates enter the filter liner 80, they eventually strike the liner material, which reduces their velocities. Large particles can fracture into smaller particles, which reduces the energy of the particle. If their energies are reduced to a sufficient level, they will become trapped in the filter material. If these smaller particles possess enough energy to travel further within the filter liner 80, they can be broken down further, reducing their energies further, and eventually trapped. The filter liner 80 is effective in reducing the energy of the particles though reductions in their mass and velocity through impacts, and temperature through heat transfer. Advantageously, as the particulates break into smaller particles, their overall surface area increases, which accelerates the cooling through heat transfer.

The random and irregular surfaces of the internal structures of the filter liner 80 help ensure that particulates will not find an easy/direct route through the liner. The tortuous paths enforced by the filter liner 80 help ensure that the particulates' energies will be reduced. These energy reductions are what allows the particulates to be trapped by the filter liner 80. If the particulates' energies are not reduced to the necessary degree, they pass or blow right through the liner and into the airbag 22. Any particulates that do manage to escape the filter liner 80 will, however, have their energies reduced to such a degree that they will not significantly damage the airbag 22.

In addition to minimizing the damaging effects of particulates on the airbag material, the filter liner also helps to minimize the effects of metallic vapor in the inflation fluid, which can contribute to the solid particulates. Metallic vapor that would normally condense and coalesce on the surface of the retainer 60 now condense and coalesce on the surfaces in the filter liner 80. The retainer 60 surfaces are planar and therefore promote vapor accumulation in comparatively large volumes that can solidify, break loose, and become particles that can damage the airbag fabric.

The filter liner 80, however, has a much larger total surface area than the retainer 60 and its surfaces are narrow, twisted, and irregular. Despite this large total surface area, the filter liner 80 does not have any surfaces large enough to permit the accumulation of large contiguous volumes of condensed and/or coalesced metals. Because of this, the volume of any metallic vapor in the inflation fluid that condenses and coalesces on the filter liner 80 will be small, as they are unable to collect in large volumes on the small, twisted, and irregular filter liner surfaces. Additionally, the large surface area of the filter liner 80 will cause any condensed and/or coalesced metals on its surface to be low temperature and, thus, low energy. As a result, even if the condensed and/or coalesced metals were to break off, their energies would be low, due to their low masses and temperatures.

From the above, it will be appreciated that the filter liner 80 is effective in reducing the energy of particulates in the inflation fluid discharged from the inflator 24. The filter liner 80 is also effective in reducing the size and energy of metals that are condensed and/or coalesced on the filter liner 80 from vapor in the inflation fluid. The energy reductions imparted by the filter liner 80 are due to reductions in mass, velocity, and temperature of the particulates and condensed/ coalesced metals. As a result, the filter liner 80 helps prevent these particulates and metals from causing damage, particularly holes, in the airbag fabric.

Figure 3:
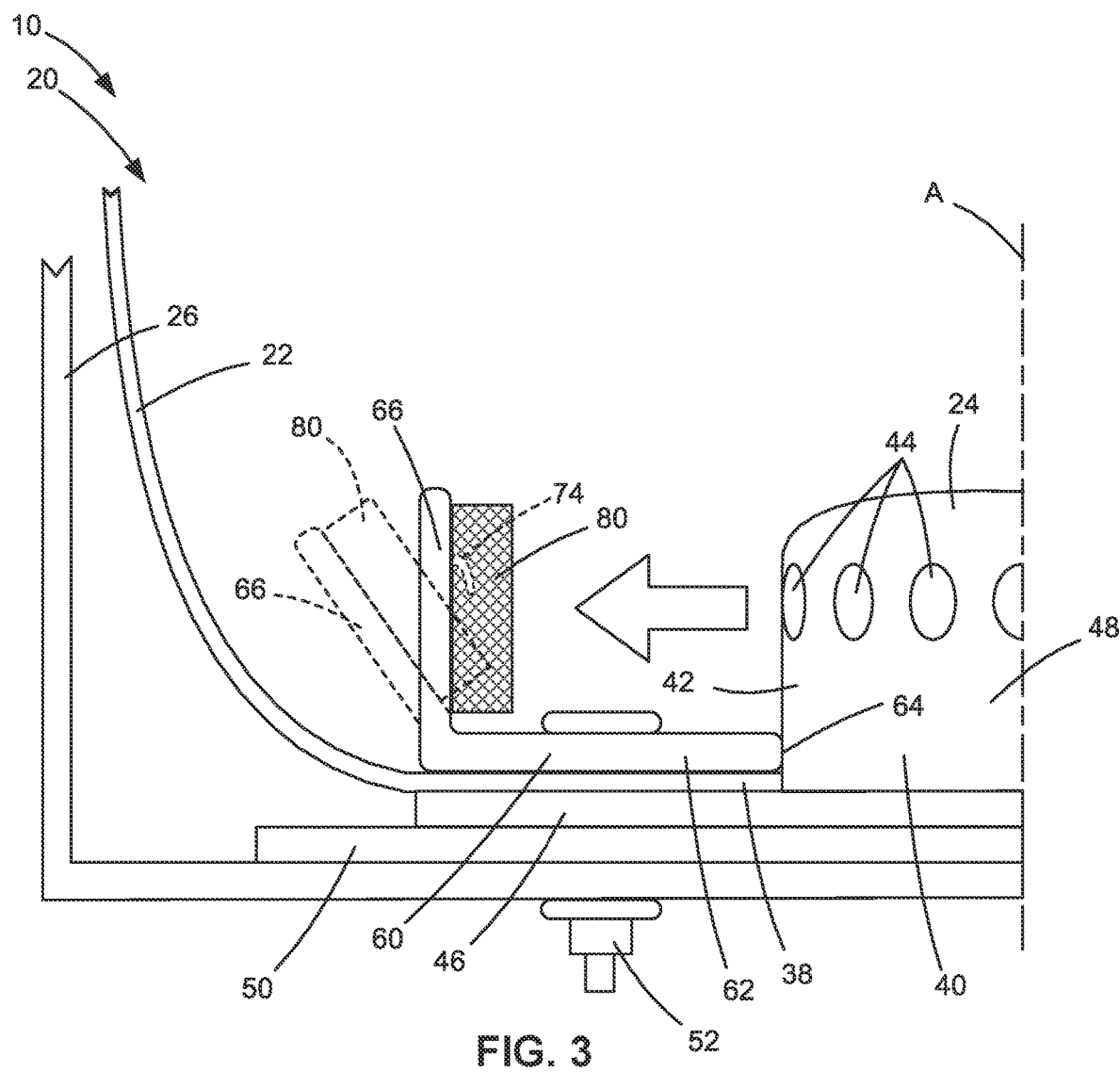
FIG. 3 is an enlarged view of a portion of the airbag module of FIG. 2.
Figure 4:
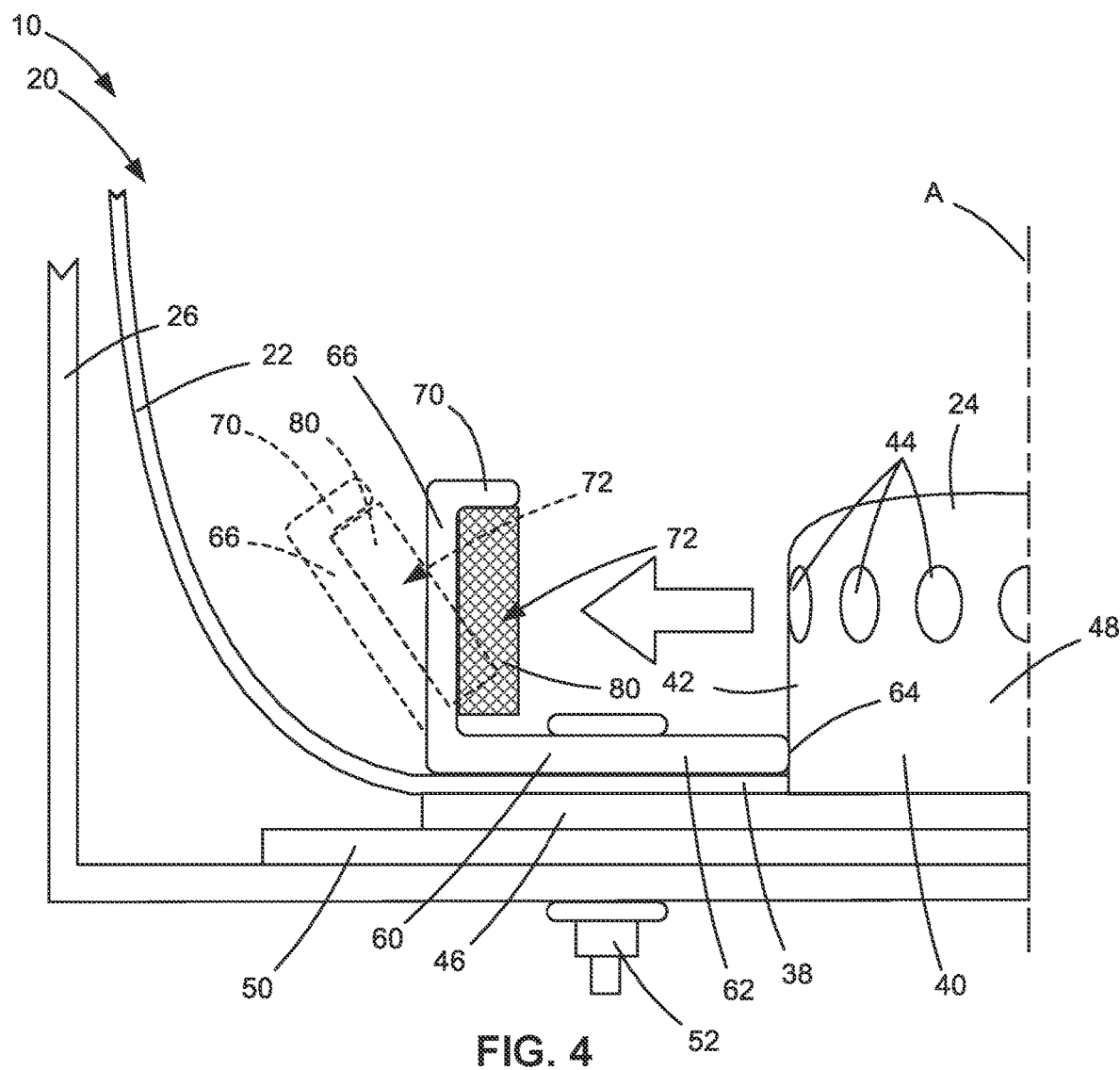
FIG. 4 is an enlarged view of a portion of the airbag module of FIG. 2.

The force applied to the retainer sidewall 64 by the inflation fluid discharged from the inflator 24 can often can be so high that the retainer sidewall is deformed outward radially, as indicated generally in dashed lines in FIGS. 3 and 4. Without the filter liner 80, the particulates would strike the deformed sidewall 64 and be deflected and redirected toward the airbag 22 without losing much energy. With the filter liner 80 in place, instead of being deflected, particulates in the inflation fluid penetrate into the filter liner, even when the liner is positioned at an angle. As a result, the energies of particulates is still reduced, as described above, due to decreases in particulate mass, reduction in particulate velocity, and reduction in particulate temperature. As a result, the particulates become trapped in the filter liner 80. It can therefore be seen that the filter liner 80 provides the advantageous benefits described herein despite deformation of the retainer sidewall 64.

Additionally in the configuration of FIG. 4, the filter liner 80 is positioned in the pocket 72 formed by the rim portion 70. In this configuration, the rim portion 70 can act as a stop that prevents any particles that may travel longitudinally through the filter material. In this configuration, where the retainer sidewall 64 deflects outwardly, the rim portion 70 can act as a stop that inhibits any particles that may travel longitudinally through the filter material From the above description of the invention, those skilled in the art will perceive improvements, changes and modifications in the invention. Such improvements, changes and modifications within the skill of the art are intended to be covered by the appended claims.

Having described the invention, I claim:

1. A retainer for securing an airbag inflator to a base plate of an apparatus for helping to protect an occupant of a vehicle, the retainer comprising:
    a base wall and a sidewall that extends from the base wall and is configured to encircle a discharge portion of the inflator from which the inflation fluid is discharged; and
    a filter liner secured to the retainer sidewall and lining a surface of the retainer sidewall that encircles and faces the discharge portion of the inflator, wherein the sidewall and filter liner are configured so that inflation fluid discharged from the discharge portion is directed toward the filter liner, wherein the retainer is configured so that the filter liner is spaced from the discharge portion of the inflator so that it can receive and reduce the energies of particulates discharged from the inflator while inflation fluid can enter the airbag without passing through the filter liner;
    wherein the retainer comprises inward-turned rim portion of the retainer sidewall, and wherein the inward-turned rim portion defines a pocket in which the filter liner is received, the retainer being configured so that the retainer sidewall deflects outwardly in response to inflation fluid discharged from the inflator, the filter liner deflecting outwardly with the retainer sidewall, wherein the rim portion is configured to block particulates that pass through the outwardly deflected filter liner.

2. An airbag module comprising:
    an airbag inflatable between a mounting structure of the vehicle and the vehicle occupant;
    an inflator that is actuatable to provide inflation fluid for inflating the airbag;
    a base plate connectable with the mounting structure; and
    the retainer recited in claim 1, wherein the retainer secures the inflator to the base plate.

3. The airbag module recited in claim 2, wherein the base wall of the retainer comprises an opening through which the discharge portion of the inflator extends, the inflator comprising a flange that projects radially from the discharge portion and is clamped between the retainer and the base plate.

4. The airbag module recited in claim 3, wherein the airbag comprises a mouth portion that is clamped between the base plate and the retainer to secure the airbag to the airbag module.

5. The airbag module recited in claim 2, wherein the inflator has a central axis and the discharge portion comprises a cylindrical sidewall centered on the inflator axis, wherein the sidewall of the retainer extends from the base wall in a direction that is parallel to the inflator axis.

6. The airbag module recited in claim 2, wherein the base plate is configured to be connected to a vehicle steering wheel and the airbag is inflatable between the vehicle steering wheel and the vehicle occupant.

7. A retainer for securing an airbag inflator to a base plate of an apparatus for helping to protect an occupant of a vehicle, the retainer comprising:
    a base wall and a sidewall that extends from the base wall and is configured to encircle a discharge portion of the inflator from which the inflation fluid is discharged; and
    a filter liner secured to the retainer sidewall, wherein the sidewall and filter liner are configured so that inflation fluid discharged from the discharge portion is directed into the filter liner,
    wherein the retainer comprises inward-turned rim portion of the retainer sidewall that defines a pocket in which the filter liner is received, the retainer being configured so that the retainer sidewall deflects outwardly in response to inflation fluid discharged from the inflator, the filter liner deflecting outwardly with the retainer sidewall, wherein the rim portion is configured to block particulates that pass through the outwardly deflected filter liner.

8. The retainer recited in claim 7, wherein the filter liner comprises a filter screen material configured to force inflation fluid directed into the filter liner to follow a tortuous path through the filter liner.

9. The retainer recited in claim 8, wherein the filter liner is configured to receive particulates in the inflation fluid and reduce the energies of the particulates in order to prevent the particulates from damaging airbag fabric.

10. The retainer recited in claim 9, wherein the filter liner is configured to reduce the energies of the particulates by reducing at least one of their mass, velocity, and temperature.

11. The retainer recited in claim 10, wherein the filter liner is configured so that the particulates strike the filter screen material and fracture.

12. The retainer recited in claim 8, wherein the filter screen material comprises at least one of a woven wire screen, knitted wire screen, a stamped metal screen, or an expanded metal screen.

13. The retainer recited in claim 8, wherein the filter screen material comprises at least one a mesh of woven or knitted metal wires or fibers, a stamped metal mesh, a mesh of bent, twisted, or otherwise intertwined metal wires or fibers, and an expanded metal mesh.

14. The retainer recited in claim 8, wherein the filter screen materials are compressed to form the filter liner.

15. The retainer recited in claim 8, wherein the filter liner is secured to the retainer sidewall via at least one of an adhesive, tape, hooks integrally formed in the retainer sidewall, a spot weld, a tack weld, and an inward-turned rim portion of the retainer sidewall that creates a pocket configured to receive the filter liner.

16. The retainer recited in claim 7, wherein the retainer sidewall comprises hooks for retaining the filter liner, the hooks extending from the retainer sidewall in a direction that is inward toward the inflator and downward toward the base wall, the hooks being configured to extend into the filter liner.

17. The retainer recited in claim 7, wherein the filter liner is spaced from the discharge portion of the inflator a distance that is at least twice a thickness of the filter liner.

18. An airbag module comprising:
an airbag inflatable between a mounting structure of the vehicle and the vehicle occupant;
an inflator that is actuatable to provide inflation fluid for inflating the airbag;
a base plate connectable with the mounting structure; and
the retainer recited in claim 7, wherein the retainer secures the inflator to the base plate.

19. The airbag module recited in claim 18, wherein the base wall of the retainer comprises an opening through which the discharge portion of the inflator extends, the inflator comprising a flange that projects radially from the discharge portion and is clamped between the retainer and the base plate.

20. The airbag module recited in claim 19, wherein the airbag comprises a mouth portion that is clamped between the base plate and the retainer to secure the airbag to the airbag module.

21. The airbag module recited in claim 18, wherein the inflator has a central axis and the discharge portion comprises a cylindrical sidewall centered on the inflator axis, wherein the sidewall of the retainer extends from the base wall in a direction that is parallel to the inflator axis.

22. The airbag module recited in claim 18, wherein the base plate is configured to be connected to a vehicle steering wheel and the airbag is inflatable between the vehicle steering wheel and the vehicle occupant.

* * * * *